United States Patent Office.

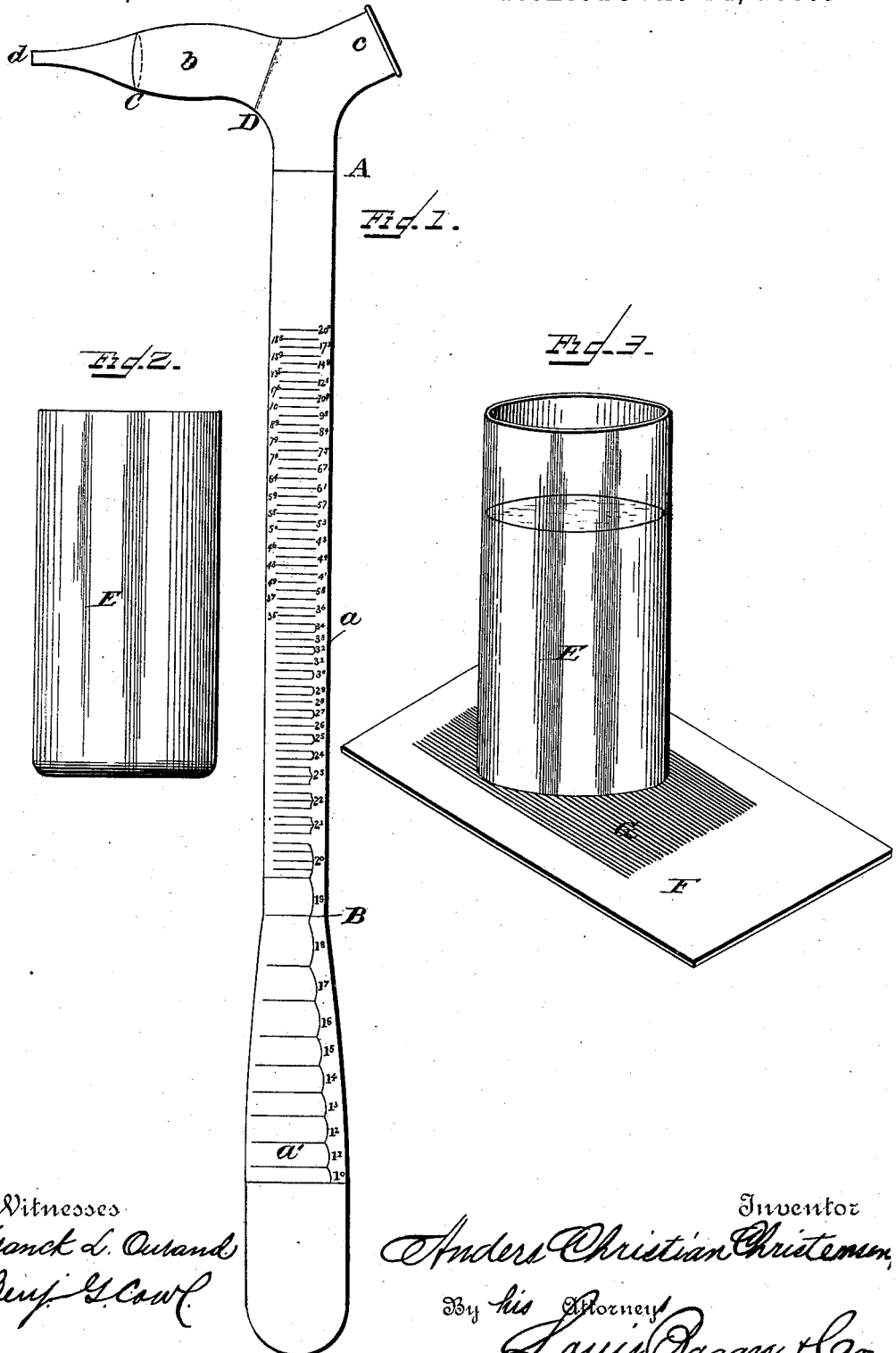

ANDERS CHRISTIAN CHRISTENSEN, OF COPENHAGEN, DENMARK.

ALBUMINIMETER.

SPECIFICATION forming part of Letters Patent No. 364,898, dated June 14, 1887.

Application filed January 8, 1887. Serial No. 223,786. (No model.)

*To all whom it may concern:*

Be it known that I, ANDERS CHRISTIAN CHRISTENSEN, a subject of the King of Denmark, residing at Copenhagen, in the Kingdom of Denmark, have invented certain new and useful Improvements in Albuminimeters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1 is a side view of my improved albuminimeter. Fig. 2 is a view of the test-glass used with it, and Fig. 3 is a perspective view illustrating the manner of using the test-glass.

Similar letters of reference indicate corresponding parts in all the figures.

My invention has relation to apparatus for determining the presence of albumen in fluids, or for determining the presence of certain products or elements contained in fluids which are affected by the addition of other fluids, and for determining the proportions in which they appear; and it consists in the improved construction of the apparatus and in the improved method of using the same, as hereinafter more fully described and claimed.

In the accompanying drawings, the letter $a$ indicates a glass tube having an enlarged and closed lower portion, $a'$, and having a number of marks or graduations upon it, besides two larger marks, A, near the upper end, and B, near the lower end. The upper end of the tube is formed with an oblique neck, $c$, for pouring liquids into it, and with a pear-shaped or irregular conical neck, $b$, having a fine aperture, $d$, at its apex, and having a mark, C, near the apex and a mark, D, near the neck of the tube. The test-glass E is true cylindrical, and is placed during test upon a card or sheet of paper, F, having a number of parallel lines, G, upon it, the said lines being of a predetermined thickness and at a predetermined distance from each other.

When the apparatus is now to be used, the fluid to be tested is filled into the pear-shaped neck of the tube through the inclined or oblique neck, the tube being held horizontally and the aperture in the end of the neck being held closed until the fluid reaches the mark D. If too much fluid is poured into the neck, the superfluous fluid may be emptied out through the aperture by removing the closing-finger from the same, and when the exact amount is obtained it is allowed to run down into the tube. A one-per-cent. solution of tannic acid is now added to the fluid until the fluid reaches in the tube to the mark B, and the tannic acid will cause the fluid to be tested to form a precipitate, which is allowed to settle in about five minutes, when it will be perfectly settled. The tube is thereupon again tilted and a solution of one part gum-arabic and two parts water is measured into the pear-shaped neck, whereupon this solution is allowed to run down into the other fluids in the tube, the gum solution being measured in the neck to the mark C. The tube is now filled with water until the entire tube is filled up to the mark A, and the precipitate formed by the action of the tannic acid upon the liquid will form an emulsion with the gum solution, rendering the entire fluid opaque. The bottom of the cylindrical test-glass is perfectly plane, and the glass is placed upon the paper or card having the parallel lines drawn upon it, the glass being so placed upon the card that the lines will be diametrical to it and will be at right angles to the direction of the light-rays falling upon them, whereupon the glass is filled with the fluid until the said lines disappear from view, the fluid being poured sufficiently carefully into the test-glass to admit of the exact quantity being poured out to obscure the view of the lines. The proportion of albumen may now be read upon the graduated tube by holding the tube in a perpendicular position, the proportion of albumen being indicated by the graduation upon the tube, which is even with the top of the fluid remaining in the tube, the graduations being marked to indicate the thousandth parts of albumen in proportion to the quantity of fluid to be tested. These graduations are first determined experimentally, and are in proportion to the size of the tube upon which they are placed. By making the lower end of the tube enlarged, as shown in the drawings, it can be made correspondingly shorter than if it were of the same length throughout, and by making the measuring portion or neck *b* pear-shaped it can be correspondingly shorter.

Any other test for the impenetrability of the fluid for light or of its opacity may be used, the graduation of the tube being changed accordingly.

It follows that the apparatus may be used for determining the presence and proportions of other contents of a fluid, a suitable fluid being used for forming a precipitate and for forming the emulsion; or, in fact, the apparatus may be used at all analyses where two or more fluids which by mixing act chemically upon each other are to be mixed in certain proportions, and where it is desired to determine the proportions of the fluid and solid products of the mixture.

Having thus described my invention, I claim and desire to secure by Letters Patent of the United States—

1. An albuminimeter consisting of a graduated tube having an enlarged lower portion, and formed with an oblique filling-neck and with a pear-shaped measuring-neck having an aperture in the apex, as and for the purpose shown and set forth.

2. The improved method of determining the presence of albumen in a fluid and its proportion, consisting in adding a precipitating solution, such as tannic acid, to the fluid, thereupon adding another fluid or solution for forming an emulsion, such as a gum solution, and thereupon determining the opacity of the fluid, as and for the purpose shown and set forth.

3. The apparatus for determining the presence of albumen and its proportion in a fluid, consisting of a tube having graduations upon its body, and having its lower end closed and formed with an oblique filling-neck and with a pear-shaped measuring-neck having an aperture in its apex, a cylindrical test-glass, and a card or paper having parallel lines of a predetermined thickness and distance, as and for the purpose shown and set forth.

In testimony whereof I have hereto affixed my signature in presence of two witnesses.

ANDERS CHRISTIAN CHRISTENSEN.

Witnesses:
FREDERIK WOLFF,
F. SCHOUBYE.